RE 25527

DESKEWING SYSTEM

Filed June 30, 1958 7 Sheets-Sheet 1

INVENTOR.
THEODORE G. FLOROS

BY [signature]

ATTORNEY

Jan. 12, 1960 T. G. FLOROS 2,921,296

DESKEWING SYSTEM

Filed June 30, 1958 7 Sheets-Sheet 2

Jan. 12, 1960 T. G. FLOROS 2,921,296

DESKEWING SYSTEM

Filed June 30, 1958 7 Sheets-Sheet 4

Jan. 12, 1960 T. G. FLOROS 2,921,296

DESKEWING SYSTEM

Filed June 30, 1958 7 Sheets-Sheet 7

United States Patent Office 2,921,296

Patented Jan. 12, 1960

2,921,296

DESKEWING SYSTEM

Theodore G. Floros, Poughkeepsie, N.Y., assignor to International Business Machines Corporation, New York, N.Y., a corporation of New York Application June 30, 1958, Serial No. 745,501

10 Claims. (Cl. 340—174)

This invention relates to a deskewing system, and more particularly to a system for reading high density records on magnetic tape in which the problem of skew is encountered in an aggravated form.

Ideally, the bits representing magnetically recorded characters should be disposed on the record tape in a line perpendicular to the length of the tape, and, upon the reading of the tape, such bits should be read simultaneously. It has been known, however, that the stated ideal cannot be achieved because of misalignment between the read-write heads and the tape during the recording and reproducing operations. Other factors, such as variation in tape speed, as well as electrical skew, contribute to the disposition of bits upon tape and the reading thereof in a somewhat serial order in respect to the several transversely recorded characters. The phenomenon is known as "skew," which may be defined as the difference in time measured between several read-back bits of a character. The total skew is the sum of the skew created when writing a character on tape and the skew created when reading the same character from tape.

Magnetic tape having low density recording thereon, i.e., 500 bits per inch or less, can be easily read, despite skew, with relatively simple reading and input equipment. Accordingly, it has been customary to read the bits of a character into an input register, one character at a time, while the bit positions of the register are held open sufficiently long to permit the storage of an entire character despite the somewhat serial arrival of the bits constituting the character. When all the skewed bits of a character are received in an input register, as stated, it is a relatively simple matter to simultaneously transfer the bits of a character from the input register to a line register or to other receiving equipment of a computer or data processing system.

Tapes having recording density of more than 5000 bits per inch in a large number of parallel tracks on tape, are now visualized. At a recording density of 1000 bits per inch or more, the problem presented by skew becomes more troublesome such that conventional data input equipment is no longer adequate to the problem. In the conventional deskewing method, a character gate of fixed length is started by the arrival of the first bit of the character. In the high density tape system envisioned herein the bit period is much smaller than the total skew and the character gate method is, therefore, not feasible.

It is, therefore, the broad objective of this invention to provide a tape reading and input system which is capable of accurately reading and receiving data recorded on magnetic tape at high density.

Regardless of the amount of skew encountered in reading a tape, the information that is recorded can be recovered if the incoming information is organized so that it can be recognized. Accordingly, the present invention provides means whereby a high density recording can be read from tape and the bits of each character are rendered intelligible to the system equipment.

Broadly stated, the invention contemplates a multi-bit skew buffer for each longitudinal tape channel in conjunction with a read-in counter for each buffer, and a read-out counter, constituting a system in which tape information is read into and out of the skew buffers sequentially under control of the sequentially advanced read-in and read-out counters.

Essentially, the deskewing system herein has imposed thereon a number of conditions which characterize its nature: it must determine when a bit period is occurring and sample the read amplifiers during such period; it must enter the sampled tape amplifier output into the proper position of a skew buffer where it is stored until all tracks have been sampled; it must determine which position of the skew buffer is to transfer into an output register; and it must determine when to transfer a character from the skew buffers to the output register.

How the invention herein fulfills its objectives and requirements will become clear from a perusal of the following description when read in light of the drawings forming a part hereof, in which drawings like reference numerals identify like parts, and in which.

When information is read from magnetic tape into a register, a time reference is needed to determine when a bit period occurs, i.e., the time during which a bit may be expected. This reference is automatically provided if a definite output of ones and zeros is read from tape and no drop-out of bits occurs. In accordance with the well known and widely used non-return to zero magnetic recording system, however, the tape reading amplifiers emit an output pulse only when a 1 is read from tape. In order to provide a definite output when zeros are read or when bit drop-out occurs, clock pulses are provided. The repetition rate of the clock pulses is made to vary with the speed of the tape. This function is accomplished in the present invention by utilizing a variable frequency clock 10 which may be of any convenient construction as, for example, the variable frequency device disclosed in the concurrently filed application of Ernest G. Newman entitled Magnetic Recording System.

The repetition rate of the pulses from the variable frequency clock 10 is controlled by a time comparison between the clock pulses and the ones being read off the tape. In order to provide for the possibility of a long sequence of zeros on tape, synchronizing pulses are recorded upon the tape at regular intervals. Thus, for example, each fifth bit recorded along the tape channels may be a synchronizing bit. The spacing of the synchronizing bits will depend on the character of the variable frequency clock memory, it being contemplated that some clocks may permit much greater spacing between the synchronizing bits. A phase or frequency difference between the output of the clock and the information read from the tape is utilized to correct the repetition rate of the clock. The variable frequency clock, as suggested above, has a memory system which maintains the clock repetition rate at its previously established value in case long gaps occur in the tape data being read. If the variations in tape speed are small, only a slight change in the repetition rate of the clock may be expected during an average drop-out of information. Thus, at the end of any gap in information, the clock pulses will be in synchronism with the information pulses.

Figure 1:
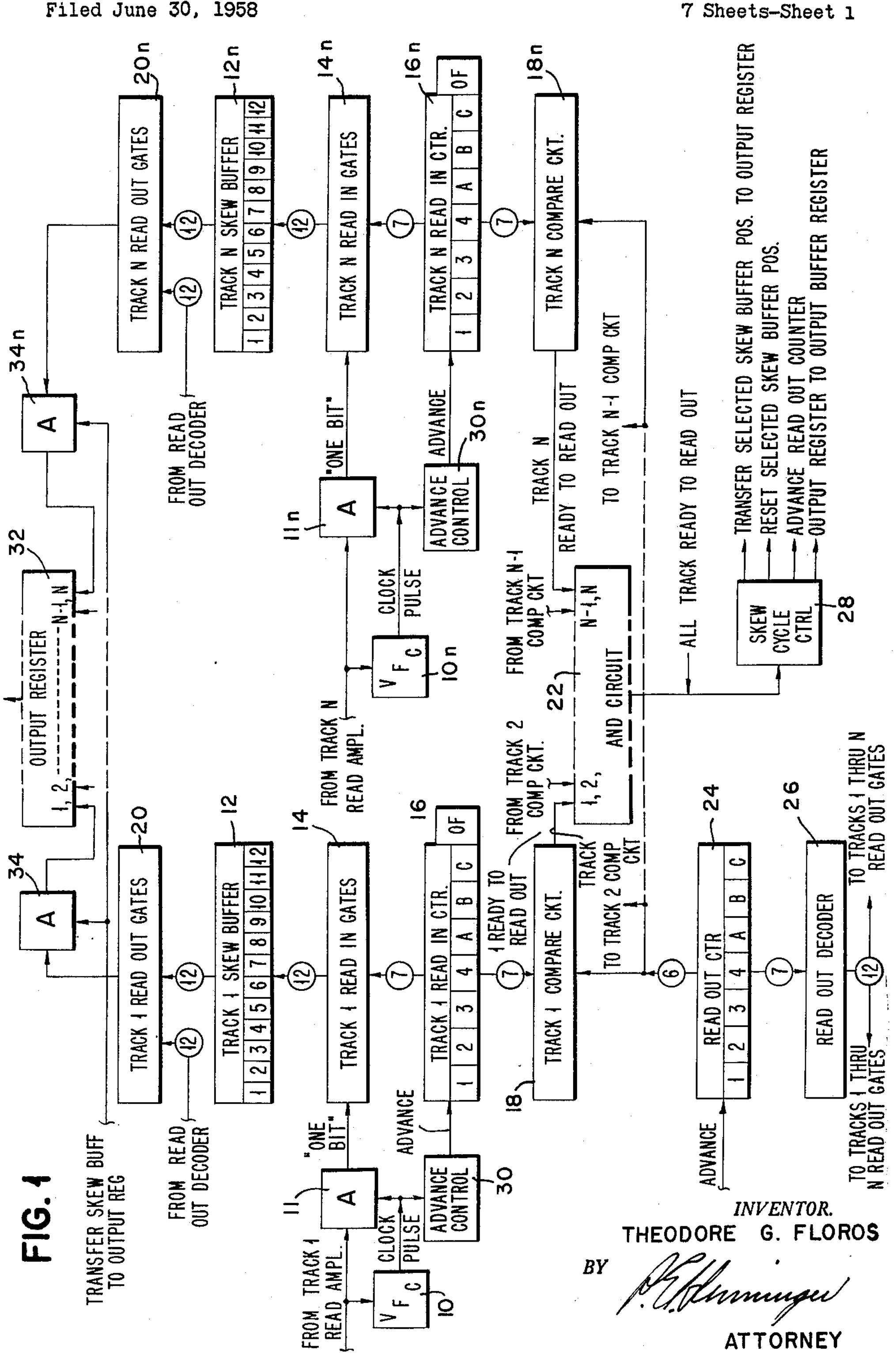
Fig. 1 is a diagrammatic illustration, in block form, of the deskewing system of the invention, indicating the circuits associated with a pair of track channels to illustrate the organization as it would exist for any desired number of channels.

As indicated in Fig. 1, the system herein provides a variable frequency clock of the stated characteristics for each tape reading channel. Thus, the clock 10 is associated in the illustration of Fig. 1 with the reading channel for the first tape track, while the clock **10*n*** is associated with the last reading channel. Each clock is synchronized by the information read from its own track and its own output pulse is used to sample the tape amplifier output during the bit period.

Figure 2:
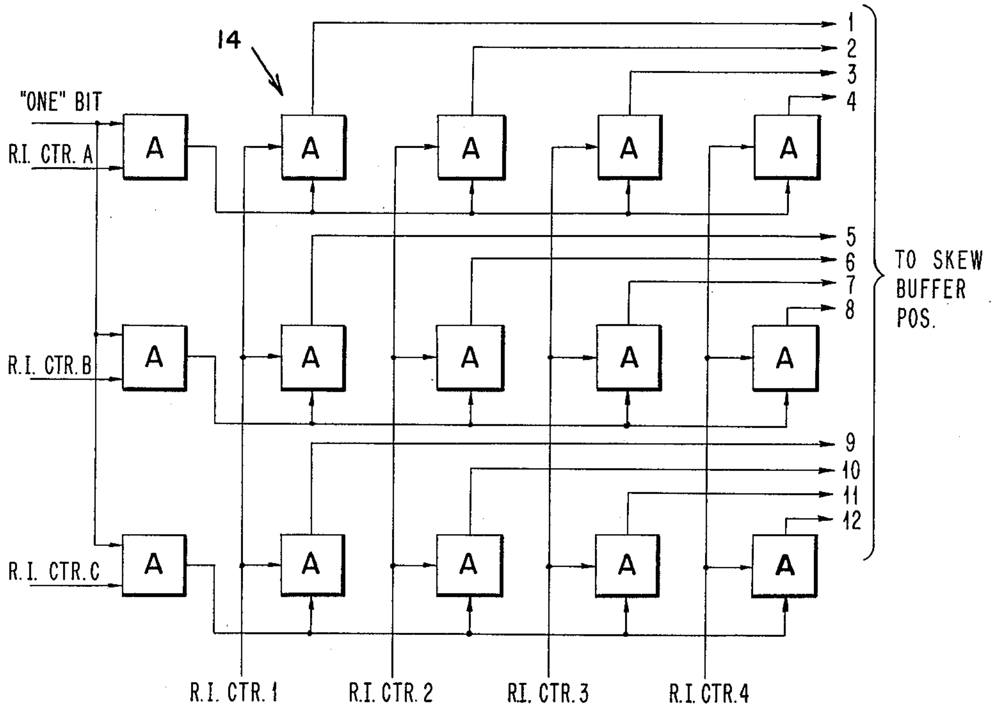
Fig. 2 is a block diagram of read-in gates associated with each tape track.
Figures 5, 6:
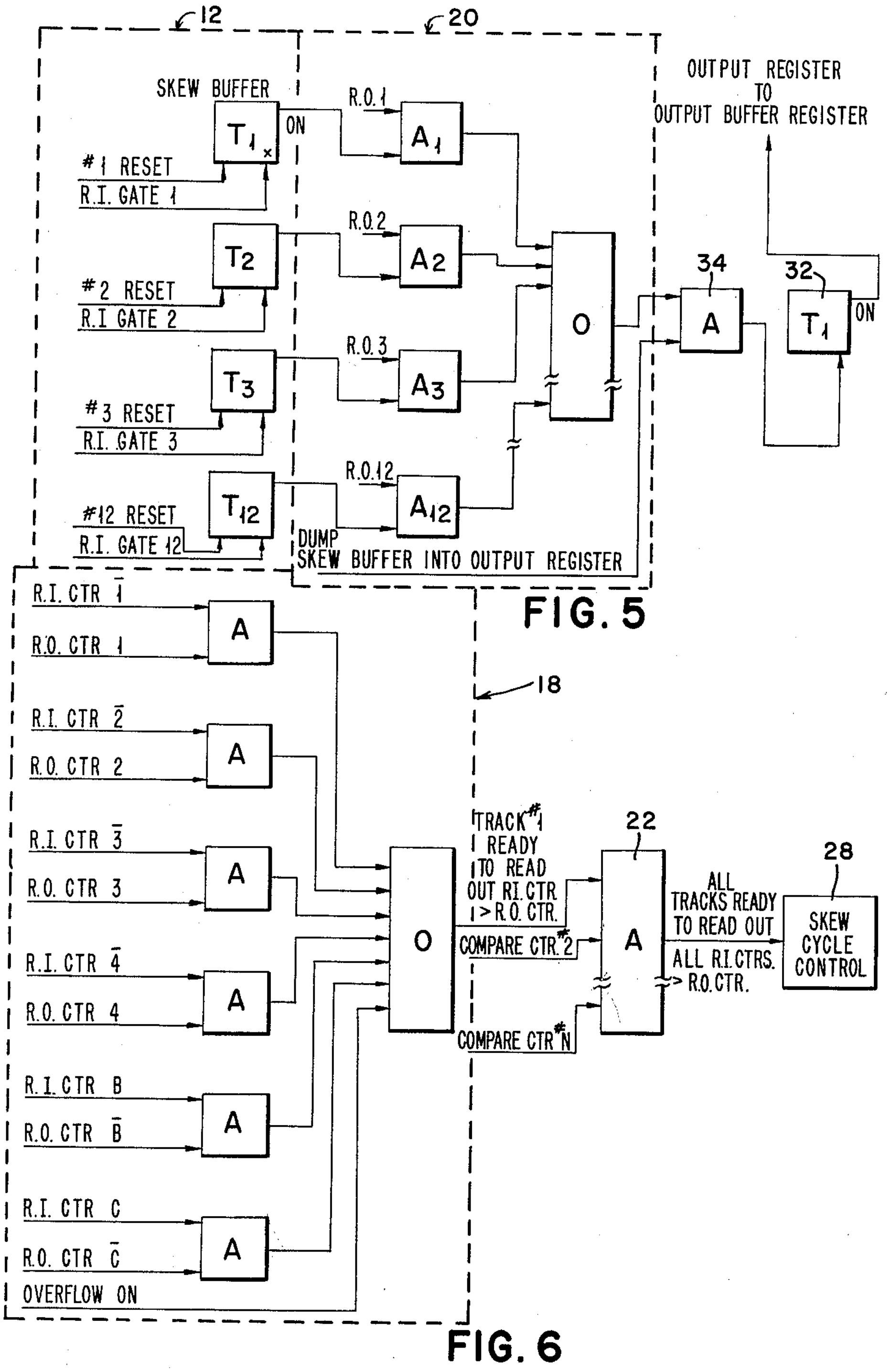
Fig. 5 is a block diagram of four positions of a skew buffer and read-out gates associated therewith, these positions being representative of any desired number.
Fig. 6 is a block diagram of a comparing circuit.

As shown in Fig. 1, each read-in channel has therein a skew buffer 12 (see also Fig. 5), a plurality of read-in gates 14 (see also Fig. 2) associated with each skew buffer, a read-in counter 16 (see also Fig. 3), comparing circuits 18 (see also Fig. 6) and read-out gates 20 (see also Fig. 5). The fact that each of the read-in channels has identical components in its organization is indicated by the components **12*n*, 14*n*, 16*n*, 18*n*, and 20*n* in the read-in circuits for tape track N. The several read-in channel circuits have associated therewith certain circuits which are common to all of the channels. Thus, it can be seen by reference to Fig. 1 that the comparing circuits 18–18*n* for all of the channels provide inputs to a common AND circuit 22 (see also Fig. 6); that a common read-out counter 24 (see also Figs. 7 and 9) delivers its output to the comparing circuits 18–18*n*; that a common read-out decoder 26 (see also Fig. 8) delivers a pulse to each of the read-out gate assemblies 20–20*n*; and that the output from the common AND circuit 20 is utilized to energize the skew cycle control circuits 28** which provide common controlling impulses for the several read channels.

The read-in counters **16–16*n* are initially set to their first position, such that the read-in gates 14–14*n* are conditioned to store the first bit of information in the first positions of the skew buffers. When the first bit period occurs, a pulse from the variable frequency clocks 10–10*n* will be transmitted to respective AND circuits 11–11*n*** and there sample the signals from their associated tape amplifiers (it being remembered that the several channels operate asynchronously). If the tape signal is a 1, the 1-bit line of the read-in gate 1 is energized such that a 1 is stored in the first position of the skew buffer or buffers associated with the tape track or tracks in which the 1 was sensed. If the tape signal on any of the input channels is a 0, nothing will be stored in the skew buffer or buffers associated with the channel or channels on which the 0 was sensed.

When the pulses from the variable frequency clocks **10–10*n* fall, advance pulses are generated in the advance control circuits 30–30*n* which advance the respective read-in counters 16–16*n* one position such that triggers $T_2$ and $T_A$ thereof are turned On, thereby conditioning the circuits of the next higher read-in gate for the storage of the next information bits into the second position of the skew buffers 12–12*n***.

Since each read-in channel has its own read-in counter, its read-in gates, and skew buffer and the remainder of the system has no control over the read-in operation, information can be read into the skew buffers at any time.

The several skew buffers **12–12*n*** are provided with a sufficient number of bit storage triggers to accommodate the most aggravated skew condition. Herein, the skew buffers have been illustrated as comprising 12 trigger storage positions. This is an arbitrary capacity selected for the purpose of simplifying the disclosure. It is contemplated that the storage capacity of the several skew buffers in each case be sufficient to control whatever skew condition may be encountered. Furthermore, since bits will be continuously read into and out of skew buffers, their bit capacity will exceed the number of bits they will be required to store at any given time.

Since the filling of a skew buffer cannot be a criterion for the read-out thereof, means must be provided for determining when buffer positions should be read out. This function is primarily determined by the comparing circuits **18–18*n* which compare the read-out counter 24 with all of the read-in counters 16–16*n***, the position of the buffers to be read-out being determined by the relative setting of the read-out counter. Characters are read into the skew buffers sequentially so that all bits of the first character are stored in the first position of the buffers, all bits of the second character are stored in the second position, etc.

Initially, the read-out counter 24 is set to its first position such that the read-out gate for the first buffer position is conditioned. When all bits of the first character have been stored, a skew cycle is initiated. During this cycle, all bits of the first character which are in the first position of the skew buffers will be transferred into the output register 32. Then all the first positions of the skew buffers will be reset. After the resetting operation, the read-out counter 24 is advanced to its second position such that the read-out gates for the second position of the skew buffers are conditioned. Thus, the read-out counter 24 selects the appropriate one of the read-out gates **20–20*n* for all tracks and in this manner the proper character is transferred into the output register 32**.

The following method is used to determine when all bits of a character have been read into skew buffers and that the character is, therefore, ready for subsequent read-out. Initially, both the read-in counters **16–16*n* and the read-out counter 24 are set to their first position. The read-in counter of every track is compared with the read-out counter 24 in the comparing circuits 18–18*n*. When the read-in counters of all the tracks are greater than the read-out counter 24, it indicates that all of the bits of the character have been stored and that the character may, therefore, be read out. The comparing circuit for each track will indicate that the track is ready to be read out and a pulse indicative of the fact is transmitted to the command AND circuit 22. When all of the bits of a character are stored, i.e., the input counter for each track is greater than the output counter 24, and consequently all of the inputs of the common AND circuit 22 are positive, a pulse is transmitted from the AND circuit 22 to the skew cycle control circuits 28 such that an output signal Transfer Selected Skew Buffer Position to Output Register is emitted from the skew cycle control circuits 28 and this signal is utilized to gate the bits in the selected position of the skew buffers through AND circuits 34–34*n* whereby the character selected by the read-out counter is transferred to the output register 32**.

The skew cycle control circuits 28 also emit a signal Reset Selected Skew Buffer Position which is utilized to reset the position of the skew buffers from which the character has been read. Also, the skew cycle control circuits 28 produce a signal Advance Read-out Counter which serves to advance the read-out counter 24 and finally, the skew cycle control circuits 28 may also produce a signal Output Register to Output Buffer Register by which transfer of characters in the output register 32 may be gated therefrom into system circuits such as, for example, an output buffer register (not shown).

The read-in counter 16 (see Fig. 3) is made up of two ring type counters consisting, respectively, of groups of bistable trigger elements $T_1$ through $T_4$ and $T_A$ through $T_C$. The two rings are used in conjunction with one another to condition a decoding matrix; in this case, the read-in gates of Fig. 2. The advance and reset pulses advance the ring made up of triggers $T_1$ through $T_4$. When the first ring is in a state such that trigger $T_1$ is to be turned On, and trigger $T_4$ is to be turned Off, an advance pulse is delivered to the second ring composed of the triggers $T_A$ through $T_C$ to advance it one position.

When the second ring composed of the triggers $T_A$–$T_C$ is ready to recycle, that is, turn trigger $T_A$ On and turn trigger $T_C$ Off, a special advance pulse is applied to an overflow trigger $T_{OF}$. This trigger indicates that the entire read-in counter has advanced through its full cycle, or has counted to its full capacity; in this instance 1 through 12.

The read-in counter 16 has only seven count outputs, therefore, the outputs of the counter must be decoded to produce an output count of 12 which corresponds to the bit storage positions of the skew buffer 12. The read-in counter of Fig. 3 should, therefore, be considered in connection with the read-in gates 14 of Fig. 2. The read-in gates constitute a matrix of coincident circuits which receive the outputs from the triggers $T_1$ through $T_4$ and the triggers $T_A$ through $T_C$ of the read-in counter such that a count of 12 is obtained from the read-in gates.

Figure 3:
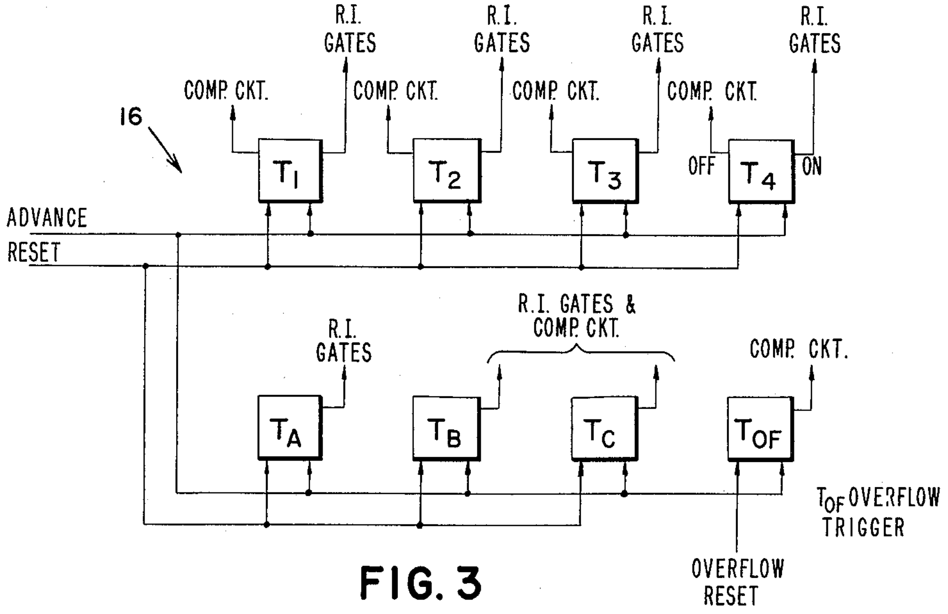
Fig. 3 is a block diagram of a read-in counter associated with each tape track.
Figure 4:
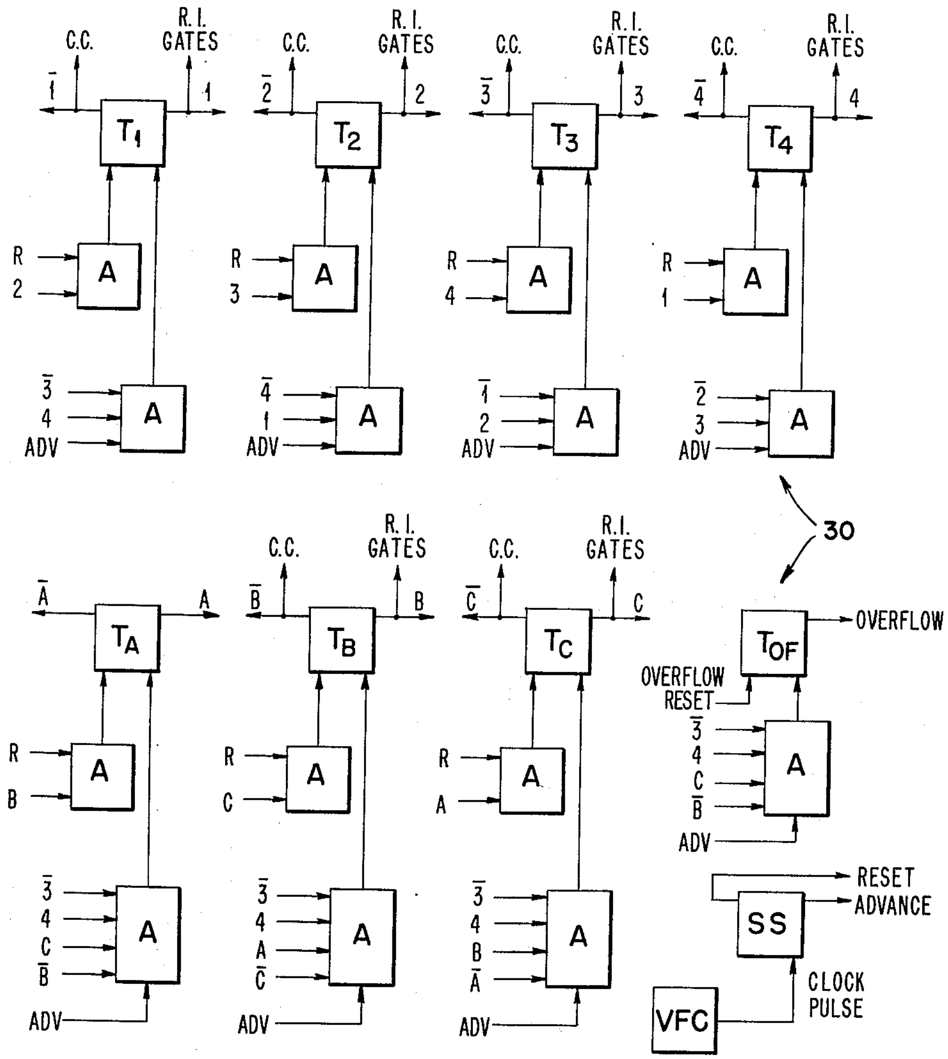
Fig. 4 is a block diagram of the advancing circuits associated with each read-in counter.
Figure 4A:
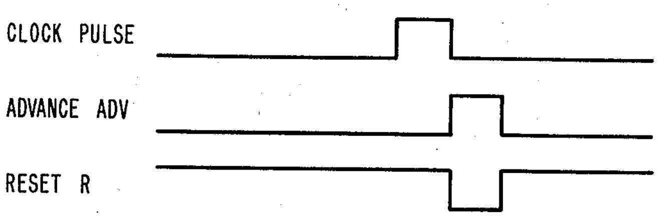
Fig. 4A is a timing diagram pertaining to a clock and advance pulse utilized in the system.
Figure 7:
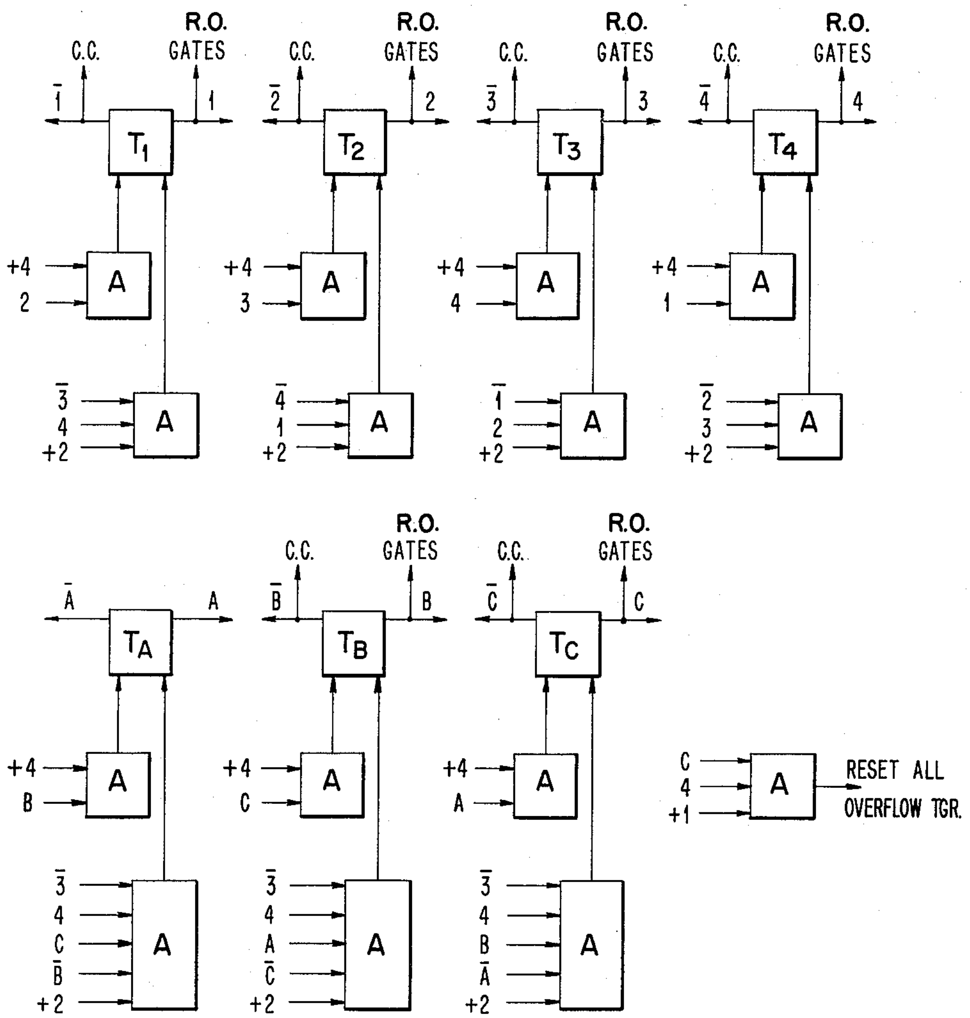
Fig. 7 is a block diagram of the advance circuits associated with the read-out counter herein.
Figure 7A:
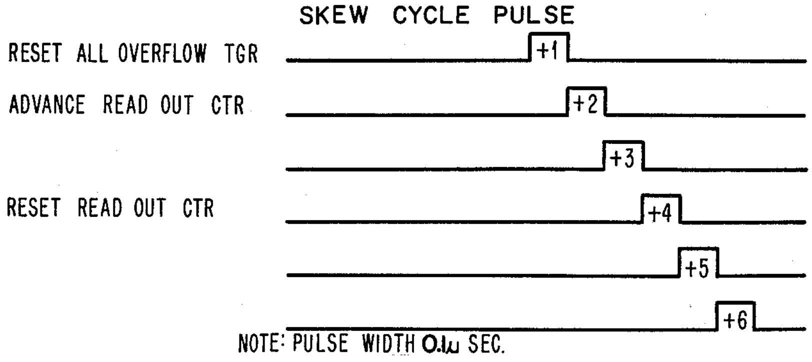
Fig. 7A is a timing diagram of the skew cycle pulses.
Figure 8:
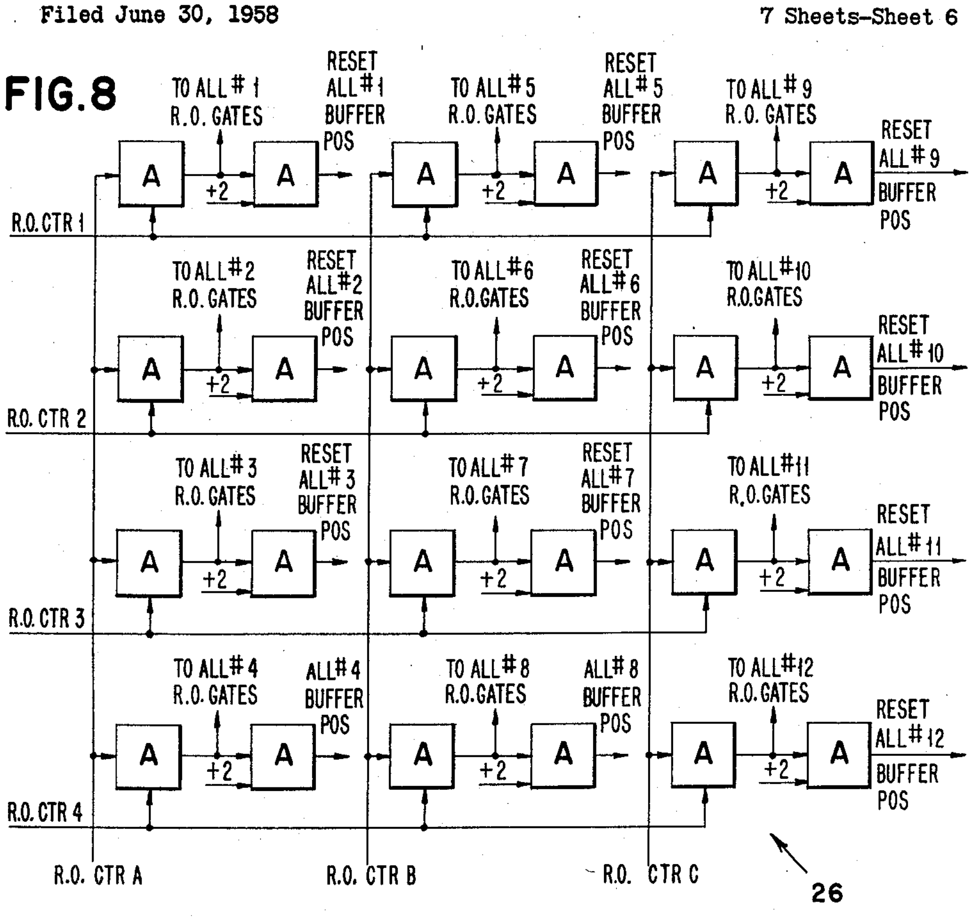
Fig. 8 is a block diagram of a read-out decoder.
Figure 9:
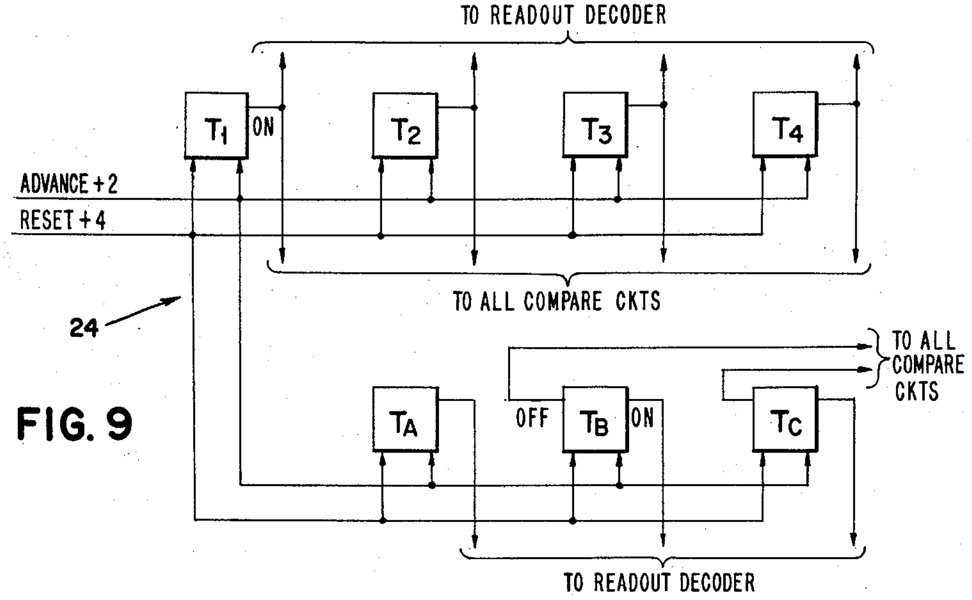
Fig. 9 is a block diagram of the read-out counter.
Figure 10:
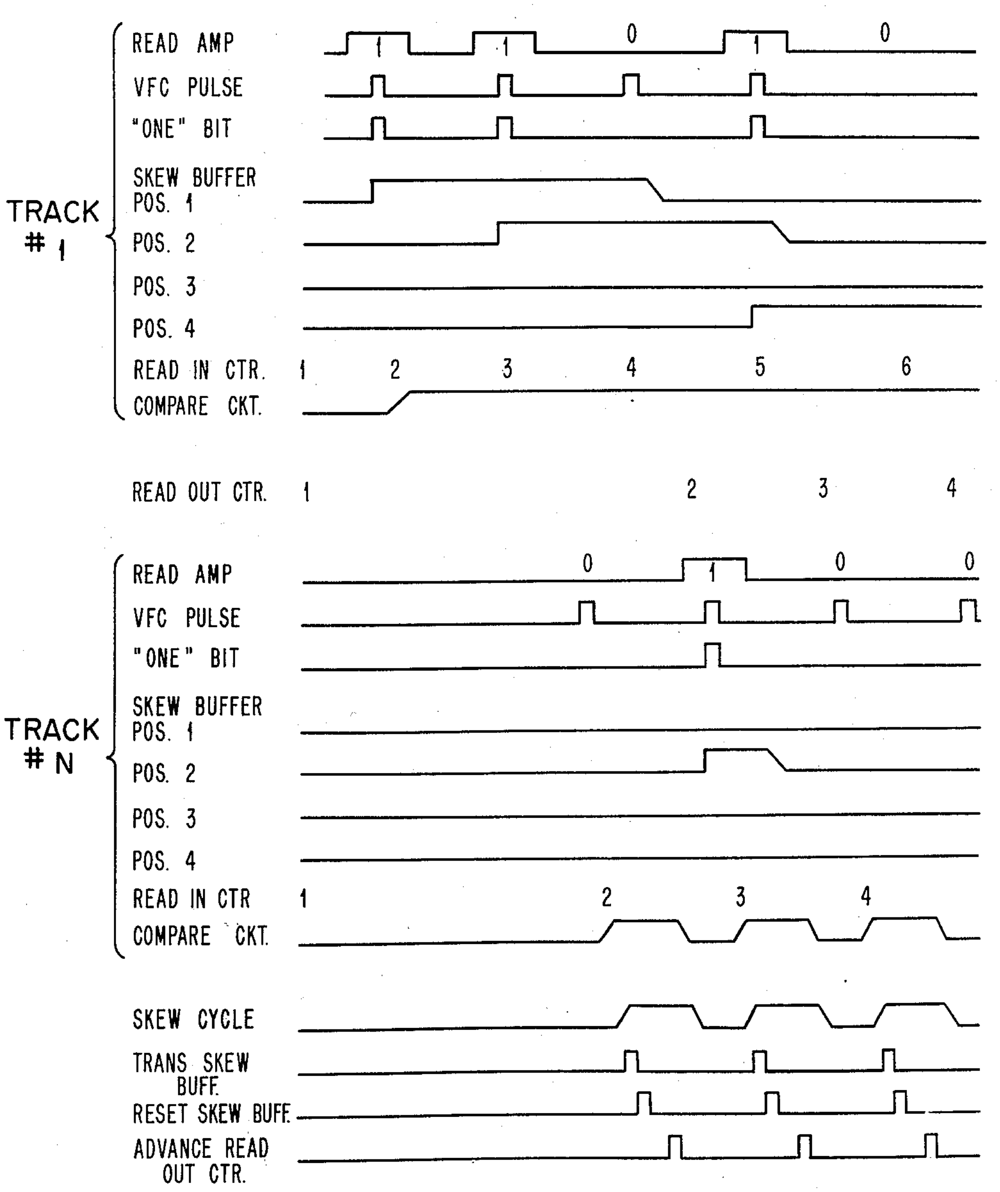
Fig. 10 is a timing chart related to the principal components of the system.

Both the read-in counter of Fig. 3 and the read-out counter of Fig. 9 should be considered in connection with their respective advance and reset circuits of Figs. 4 and 7. More will be said of these advance and reset circuits at a later point herein. It is presently sufficient to say that the diagrammatic illustration of the read-in counter 16 of Fig. 3 and the read-out counter 24 of Fig. 9 have been simplified to show only the entry of advance and reset pulses and do not include the coincident logic of the advance and reset circuits of Figs. 4 and 7, respectively. The manner in which the AND circuits of Figs. 4 and 7 combine respectively with the circuits of Figs. 3 and 9 will be apparent when it is appreciated that the triggers $T_1$ through $T_4$ and $T_A$ through $T_C$ of Fig. 4 are the same as the triggers $T_1$ through $T_4$ and $T_A$ through $T_C$ of Fig. 3, and that the triggers $T_1$ through $T_4$ and $T_A$ through $T_C$ of Fig. 7 are the same as the triggers $T_1$ through $T_4$ and $T_A$ through $T_C$ of Fig. 9. As stated above, the purpose and operation of the advancing and reset circuits of Figs. 4 and 7 will be dwelt on at greater length hereinafter.

The comparing circuits of Fig. 6 comprise six AND circuits which are, respectively, adapted to receive the output of the several corresponding stages of the read-in counter 16 and the read-out counter 24. The comparing circuit of Fig. 6 is designed to emit a signal when all of a particular position in the skew buffer is completely filled. To perform this function, a comparison is made between the setting of the read-in counter 16 for each channel and the setting of the read-out counter 24. When the read-in counter initially advances, it will give an indication to its comparing circuit by activating one of the two-way AND circuits of its comparing unit. Essentially it must be determined that the setting of the read-in counter is greater than the setting of the read-out counter.

Initially all the read-in counters are set with their first position On and all other positions Off. At the same time, the initial condition of the read-out counter will be the same, i.e., read-out counter position one On, all other positions thereof Off. When the read-in counter for a particular channel advances, as may be determined, for example, by reference to Fig. 6, the 1 position of the read-in counter comes On at the same time the 2 position comes On. Thus, the first two-way AND circuit, Fig. 6, of the comparing unit is conditioned to give an output; that is, read-in counter 1 On, read-out counter 1 On. This indicates that the read-in counter is at some value other than 1 and that the read-out counter is still at 1. The condition that the read-in counter for the particular channel be greater than the read-out counter is, therefore, fulfilled in this particular case. An output pulse will, therefore, be transmitted through the seven-way OR circuit to the AND circuit 22. The inputs to the AND circuit 22 are the outputs from each of the comparing circuits 18–18*n*. When the comparing circuits for all of the channels indicate that the read-in counters thereof are greater than the read-out counter, AND circuit 22 will be conditioned to emit an output pulse to the skew cycle control circuits 28. The process is repeated sequentially through each AND circuit of the comparing units.

The read-in counter and the read-out counter, as shown in Figs. 3 and 9 respectively, each has seven trigger positions therein. Each comparing circuit, as noted by reference to Fig. 6, however, utilizes the output of only six of these stages for the purpose of its comparisons. When the read-in counter has made a complete cycle, i.e., when it has counted to its full capacity and has started to recycle, it may appear to the circuits controlled thereby that the read-out counter is greater than the read-in counter, when, in fact, this is not the case. To account for this latter contingency, the read-in counter has an overflow trigger $T_{OF}$ which is turned On when the counter begins to recycle. The output from the overflow trigger is fed directly to the OR circuit in the comparing unit. When the read-out counter is completely cycled, the overflow trigger $T_{OF}$ is turned Off. The overflow trigger, therefore, serves to indicate that the read-in counter is greater than the read-out counter in the case where the read-in counter has cycled but the read-out counter has not.

The read-in counters and the read-out counters are made up of a pair of rings which characteristically are coupled in cascade such that only one position of the counter will be On at any given time. When an advance pulse comes into this type of counter, the first trigger position being On, it will turn the second trigger On. This type of advance continues throughout the ring operation. It can be seen, therefore, that immediately after the advance pulse, two triggers will be On. The reset pulse will come along and leave only the newly set trigger On. The logic of the trigger is such that output may be taken from either the On side or from the Off side, or from both sides. When the trigger is On, the On side will produce a positive indication and the Off side will produce a negative indication. When one side of the trigger is Off its other side is conducting, or On, thus, the outputs are available in complement form.

Reference to Figs. 3 and 4 will clarify the operation of the counters. When an advance pulse appears on the advance line of any one of the associated AND circuits, the present status of the counter triggers will determine which trigger of the counter will be turned On next. Since the triggers of the counter are turned On serially, the condition of the trigger immediately preceding the trigger which is to be turned On, i.e., the trigger presently On will, in addition to the advance pulse, be a condition for the turning On of the next trigger under the influence of the advance pulse. Furthermore, to prevent an advance pulse from turning On all of the triggers in the ring, the condition of the trigger preceding the trigger which is On at the time the advance pulse arrives, is sampled and is also an input to the AND circuit associated with the trigger to be turned On. The reset pulse, as may be seen in Fig. 4, is also transmitted through AND circuits whose other input is the output of the next following trigger, i.e., the trigger which has just been turned On.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a system for reading a magnetic tape having the bits constituting the characters recorded thereon in a multiplicity of parallel tracks, a reading channel for each tape track, a multi-position storage register for the reading channel for each tape track, means for entering tape originated pulses into successive positions of said registers under control of a read-in counter individual to each register, a read-out counter, means for comparing the setting of each of said read-in counters with the setting of said read-out counter, means for determining when the setting of each of said read-in counters is greater than the setting of said read-out counter, and means under control of said last named means for simultaneously reading from said registers the bits of a single character when said determining means indicates that the setting of each of said read-in counters is greater than the setting of said read-out counter.

2. In a system for reading a magnetic tape having the bits constituting the characters recorded thereon in a multiplicity of parallel tracks, a reading channel for each tape track, a multi-position storage register for the reading channel for each tape track, means for entering tape originated pulses into successive positions of said registers under control of a read-in counter individual to each register, a read-out counter, means for comparing the setting of each of said read-in counters with the setting of said read-out counter, means for determining when the setting of each of said read-in counters is greater than the setting of said read-out counter, means under control of said last named means for simultaneously reading from said registers the bits of a single character when said determining means indicates that the setting of each of said read-in counters is greater than the setting of said read-out counter, and means for advancing said read-out counter after each character read-out operation.

3. In a system for reading a magnetic tape having the bits constituting the characters recorded thereon in a multiplicity of parallel tracks, a reading channel for each tape track, a multi-position storage register for the reading channel for each tape track, means for entering tape originated pulses into successive positions of said registers under control of a read-in counter individual to each register, a read-out counter, means for comparing the setting of each of said read-in counters with the setting of said read-out counter, a coincidence circuit for determining when the setting of each of said read-in counters is greater than the setting of said read-out counter, inputs from each of said comparing means to said coincidence circuit, and means under control of an output from said coincidence circuit for simultaneously reading from said registers the bits of a single character when said determining means indicates that the setting of each of said read-in counters is greater than the setting of said read-out counter.

4. In a system for reading a magnetic tape having the bits constituting the characters recorded thereon in a multiplicity of parallel tracks and having synchronizing bits recorded at regular intervals in the tracks thereof, a reading channel for each tape track, a multi-position storage register for the reading channel for each tape track, means individual to each reading channel controlled by synchronizing pulses from a tape being read for generating pulses defining bit entry periods, a read-in counter adapted to control entry of tape originated pulses on said channels into their respective register positions, a connection between said synchronizing pulse controlled means and its related counter whereby said counters are advanced at each bit entry period, a read-out counter, means for comparing the setting of each of said read-in counters with the setting of said read-out counter, means for determining when the setting of each of said read-in counters is greater than the setting of said read-out counter, and means under control of said last named means for simultaneously reading from said registers the bits of a single character when said determining means indicates that the setting of each of said read-in counters is greater than the setting of said read-out counter.

5. In a system for reading a magnetic tape having the bits constituting the characters recorded thereon in a multiplicity of parallel tracks, a reading channel for each tape track, a multi-position storage register for the reading channel for each tape track, means for entering tape originated pulses directly into successive positions of said registers under control of a read-in counter individual to each register, a read-out counter, means for comparing the setting of each of said read-in counters with the setting of said read-out counter, means for determining when the setting of each of said read-in counters is greater than the setting of said read-out counter, means under control of said last named means for simultaneously reading from said registers the bits of a single character when said determining means indicates that the setting of each of said read-in counters is greater than the setting of said read-out counter, and means under control of said last named means for resetting the register positions from which the bits of a character have been read.

6. In a system for reading a magnetic tape having the bits constituting the characters recorded thereon in a multiplicity of parallel tracks, a reading channel for each tape track, a multi-position storage register for the reading channel for each tape track, means for entering tape originated pulses into successive positions of said registers under control of a read-in counter individual to each register, a read-out counter, means for comparing the setting of each of said read-in counters with the setting of said read-out counter, means for determining when the setting of each of said read-in counters is greater than the setting of said read-out counter, means under control of said last named means for simultaneously reading from said registers the bits of a single character when said determining means indicates that the setting of each of said read-in counters is greater than the setting of said read-out counter, and means under control of said last named means for advancing said read-out counter.

7. In a system for reading a magnetic tape having the bits constituting the characters recorded thereon in a multiplicity of parallel tracks, a reading channel for each tape track, a multi-position storage register composed of bistable electronic elements for the reading channel for each tape track, means for entering tape originated pulses into successive positions of said registers under control of a read-in counter individual to each register, a read-out counter, means consisting of a plurality of coincidence circuits for comparing the setting of each of said read-in counters with the setting of said read-out counter, an additional coincidence circuit for receiving the output of said comparing means, and means under control of said additional coincidence circuit for simultaneously reading from said registers the bits of a single character when said additional coincidence circuit emits an output to indicate that the setting of each of said read-in counters is greater than the setting of said read-out counter.

8. In a system for reading a magnetic tape having the bits constituting the characters recorded thereon in a multiplicity of parallel tracks, a reading channel for each tape track, a multi-position storage register composed of bistable electronic elements for the reading channel for each tape track, means for entering tape originated pulses into successive positions of said registers under control of a read-in counter individual to each register, a read-out counter, means consisting of a plurality of coincidence circuits for comparing the setting of each of said read-in counters with the setting of said read-out counter, an additional coincidence circuit for receiving the output of said comparing means, means under control of said additional coincidence circuit for simultaneously reading from said registers the bits of a single character when said additional coincidence circuit emits an output to indicate that the setting of each of said read-in counters is greater than the setting of said read-out counter, and means for advancing said read-out counter after each character read-out operation.

9. In a system for reading a magnetic tape having the bits constituting the characters recorded thereon in a multiplicity of parallel tracks, a reading channel for each tape track, a multi-position storage register composed of bistable electronic elements for the reading channel for each tape track, means for entering tape originated pulses into successive positions of said registers under control of a read-in counter individual to each register, a read-out counter, means consisting of a plurality of coincidence circuits for comparing the setting of each of said read-in counters with the setting of said read-out counter, an additional coincidence circuit for receiving the output of said comparing means, means under control of said additional coincidence circuit for simultaneously reading from said registers the bits of a single character when said additional coincidence circuit emits an output to indicate that the setting of each of said read-in counters is greater than the setting of said read-out counter, and means also under control of said last named means for resetting the register positions from which the bits of a character have been read.

10. In a system for reading a magnetic tape having the bits constituting the characters recorded thereon in a multiplicity of parallel tracks, a reading channel for each tape track, a multi-position storage register composed of bistable electronic elements for the reading channel for each tape track, means for entering tape originated pulses into successive positions of said registers under control of a read-in counter individual to each register, a read-out counter, means consisting of a plurality of coincidence circuits for comparing the setting of each of said read-in counters with the setting of said read-out counter, an additional coincidence circuit for receiving the output of said comparing means, means under control of said additional coincidence circuit for simultaneously reading from said registers the bits of a single character when said additional coincidence circuit emits an output to indicate that the setting of each of said read-in counters is greater than the setting of said read-out counter, and means also under control of said last named means for advancing said read-out counter.

No references cited.